(12) United States Patent
Herrero Abellanas et al.

(10) Patent No.: US 9,043,659 B2
(45) Date of Patent: May 26, 2015

(54) BANKING OF RELIABILITY METRICS

(71) Applicant: Intel Corporation, Santa Clara, CA (US)

(72) Inventors: Enric Herrero Abellanas, Cardedeu (ES); Xavier Vera, Barcelona (ES); Javier Carretero Casado, Barcelona (ES); Tanausu Ramirez, Barcelona (ES); Nicholas Axelos, Barcelona (ES); Daniel Sanchez, L'Hospitalet de Llobregat (ES)

(73) Assignee: Intel Corporation, Santa Clara, CA (US)

( * ) Notice: Subject to any disclaimer, the term of this patent is extended or adjusted under 35 U.S.C. 154(b) by 207 days.

(21) Appl. No.: 13/729,400

(22) Filed: Dec. 28, 2012

(65) Prior Publication Data
US 2014/0189439 A1 Jul. 3, 2014

(51) Int. Cl.
*G06F 11/00* (2006.01)

(52) U.S. Cl.
CPC .................................. *G06F 11/008* (2013.01)

(58) Field of Classification Search
CPC ..................................................... G06F 11/008
USPC ................................... 714/1, 47.3, 47.1, 47.2
See application file for complete search history.

(56) References Cited

U.S. PATENT DOCUMENTS

| 7,739,579 B2 * | 6/2010 | Kameyama et al. | 714/769 |
| 2005/0097287 A1 * | 5/2005 | Melament et al. | 711/162 |
| 2009/0048808 A1 * | 2/2009 | Bose et al. | 702/186 |
| 2009/0198737 A1 * | 8/2009 | Sims | 707/200 |
| 2014/0208167 A1 * | 7/2014 | Krampen et al. | 714/37 |

* cited by examiner

*Primary Examiner* — Dieu-Minh Le
(74) *Attorney, Agent, or Firm* — Trop, Pruner & Hu, P.C.

(57) ABSTRACT

In one embodiment, a processor includes at least one functional block and banking logic. The banking logic may be to determine an average reliability metric associated with the at least one functional block. The banking logic may also be to, if the average reliability metric exceeds a required level, implement a reduced reliability mode in the at least one functional block, where the reduced reliability mode is associated with a reduction in the average reliability metric. Other embodiments are described and claimed.

17 Claims, 9 Drawing Sheets

BANKING OF RELIABILITY METRICS

BACKGROUND

Embodiments relate generally to reliability metrics.

Generally, electronic devices may experience failure events during their operational lifetimes. Such devices may thus be engineered to conform to a reliability specification. The reliability specification may specify a target failure rate, meaning the maximum number of failures that may be acceptable within a specified time period. Alternatively, the reliability specification may specify a mean time between failures (MTBF), meaning the minimum average time between failure events that may be acceptable.

DETAILED DESCRIPTION

In accordance with some embodiments, management of reliability metrics may be provided. In one or more embodiments, a reliability metric may be averaged over time, such that periods of reliability surplus (i.e., the reliability metric exceeds a required level) may be offset by periods of reliability deficit (i.e., the reliability metric is below the required level). In some embodiments, the average of the reliability metric may meet or exceed the required level. Further, in some embodiments, the periods of reliability deficit may be associated with a reduction in electrical power consumption. Accordingly, in some embodiments, the required level of reliability may be satisfied while also reducing total power consumption.

Figure 1A:
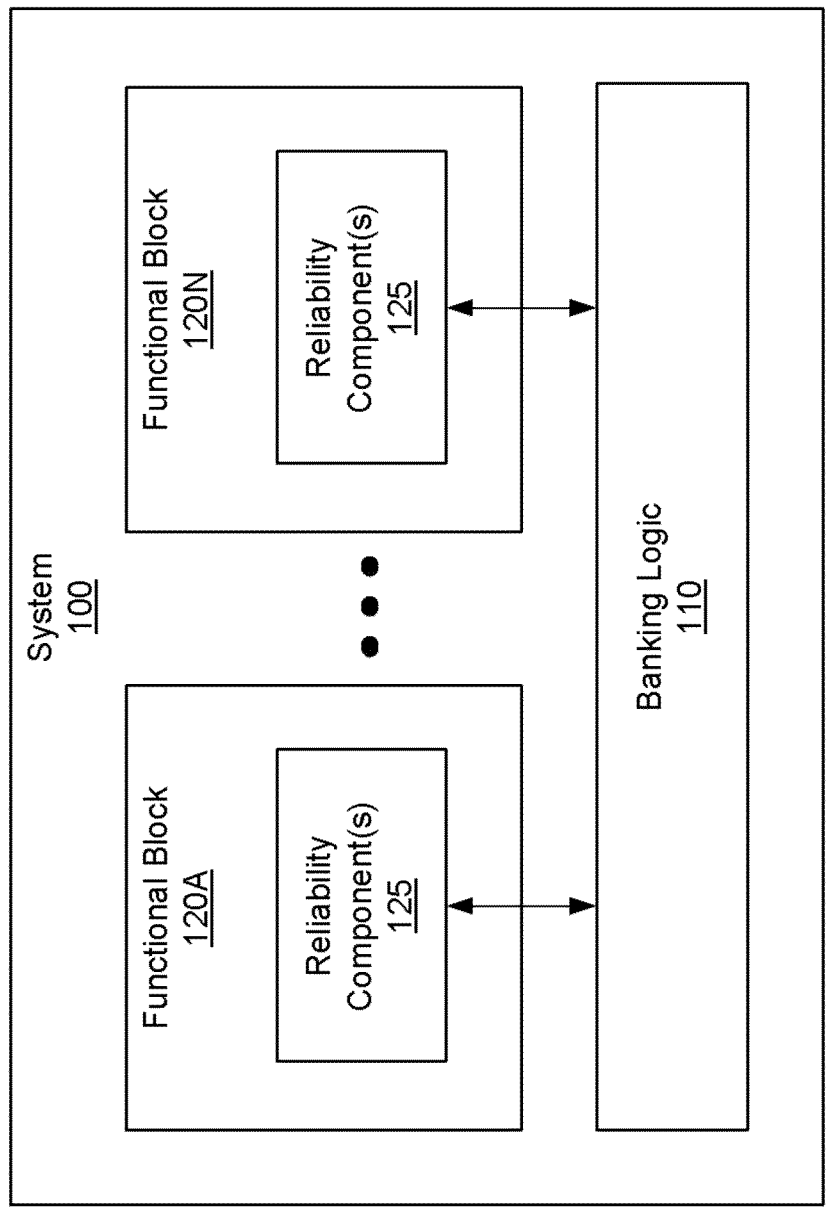
FIGS. 1A-1B are block diagrams of systems in accordance with one or more embodiments.

Referring to FIG. 1A, shown is a block diagram of a system 100 in accordance with one or more embodiments. In some embodiments, the system 100 may be all or a portion of an electronic device or component. For example, the system 100 may be a cellular telephone, a computer, a server, a network device, a processor, a system on a chip (SoC), a controller, a wireless transceiver, a power supply unit, etc. Furthermore, in some embodiments, the system 100 may be any grouping of related or interconnected devices, such as a datacenter, a computing cluster, a peer-to-peer (P2P) network, a local area network (LAN), a wide area network (WAN), a wireless ad hoc network, etc.

As shown in FIG. 1A, the system 100 may include any number of functional blocks 120A-120N. In embodiments in which the system 100 is all or a portion of a device, each functional block 120 may be one or more components configured to perform a specified function (or functions). For example, in such embodiments, the functional blocks 120A-120N may represent hardware modules included in a computer, processing cores included in a processor, radio interface modules included in a wireless communication device, etc. Further, in embodiments in which the system 100 is a grouping of devices, each functional block 120 may represent one of such devices. For example, in such embodiments, the functional blocks 120A-120N may represent computers included in a datacenter, nodes included in a computing cluster, blade servers included in an enclosure, drives included in a storage array, etc.

In one or more embodiments, each functional block 120 may be associated with a reliability metric. The reliability metric may be any measure of the ability of a system or component to perform its required function(s) for a specified period of time. Further, the reliability metric may be defined in terms of a probability of failure, a time or frequency of failure, and/or an availability. For example, the reliability metric may be a Failures in Time (FIT) metric indicating the number of failures that can be expected in a specified time period of operation (e.g., one hour, one year, one billion hours, etc.). In another example, the reliability metric may be a mean time between failures (MTBF) metric, indicating a predicted elapsed time between failures when the system or component is going to be repaired and returned to service. In still another example, the reliability metric may be a mean time to failure (MTTF) metric, indicating the mean time expected until failure when the system or component is not repaired. Note that these examples are not limiting, and it is contemplated that embodiments may use any reliability metric(s).

In one or more embodiments, each functional block 120 may be associated with a required level of the reliability metric. As used herein, "required level" refers to a target value of the reliability metric (associated with the functional block 120) that the functional block 120 must meet or exceed to satisfy a specification for the reliability of the system 100. The required level may be specified by, e.g., a design specification, a service agreement, a customer requirement, etc. Note that, as used herein, "exceeding the required level" refers generally to achieving a relatively higher degree of reliability than the required level, but does not necessarily indicate reaching a larger numerical metric value. In particular, for reliability metrics in which relatively smaller values reflect better reliability, "exceeding the required level" may refer to achieving a lower numerical value than the required level. For example, assuming a FIT reliability metric having a required level of ten failures in one billion hours, "exceeding the required level" may refer to achieving a lower number of failures (e.g., eight failures) during the period of one billion hours.

As shown, in one or more embodiments, each functional block 120 may include one or more reliability components 125. As used herein, "reliability component" refers to any component of a functional block 120 which may affect the reliability metric associated with the functional block 120. For example, assume that the functional block 120 is a wireless communication device, and that the reliability components 125 include a transceiver, a power supply, an error correction module, etc. (not shown). Note that, in this example, the operation or failure of any of these reliability components 125 could affect the ability of the wireless communication device to accurately transmit information over radio links. As such, these reliability components 125 may affect the reliability metric associated with the wireless communication device.

In another example, assume that the system 100 is a datacenter, and that each functional block 120 is a computer server. Assume further that the reliability components 125 include components of each computer server, including processors, power supplies, network interfaces, drives, backup devices, processor cores, etc. (not shown). Note that the operation or failure of any of these reliability components 125 could affect the reliability of the computer server and the datacenter.

As shown, in one or more embodiments, the system 100 may include banking logic 110. In some embodiments, the banking logic 110 may include functionality to obtain a current reliability metric value, meaning an estimated or predicted value of a reliability metric at a particular point in time. In one or more embodiments, the current reliability metric value may be based on one or more aspects of the current operating state and/or configuration of the system 100 (referred to herein as "system factors"). For example, the banking logic 110 may determine the current reliability metric periodically (e.g., once per minute, once per hour, etc.) based on a frequency or voltage level of a reliability component 125, the number of functional blocks 120 included in the system 100, etc. In another example, the current reliability metric may be based on architectural vulnerability factors (AVFs), meaning the failure probabilities associated with the physical structures of a functional block 120 and/or the system 100.

In some embodiments, the current reliability metric may also be based on one or more aspects of the operating environment of the system 100 (referred to herein as "environmental factors"). For example, the banking logic 110 may determine the current reliability metric based on environmental factors such as temperature, humidity, altitude, network traffic, solar flare activity, etc. In addition, it is contemplated that the current reliability metric may be based on any other factor(s).

In one or more embodiments, the banking logic 110 may include storage to store multiple current reliability metric values, with each value corresponding to a unique point in time. Stated differently, the banking logic 110 may store historical data describing the estimated or predicted value of the reliability metric at various points in time. In some embodiments, the banking logic 110 may also include functionality to average the stored current reliability metric values corresponding to a defined time period. The result of such averaging may be referred to as an "average reliability metric." An example of an average reliability metric is described below with reference to FIG. 2A.

Figure 2A:
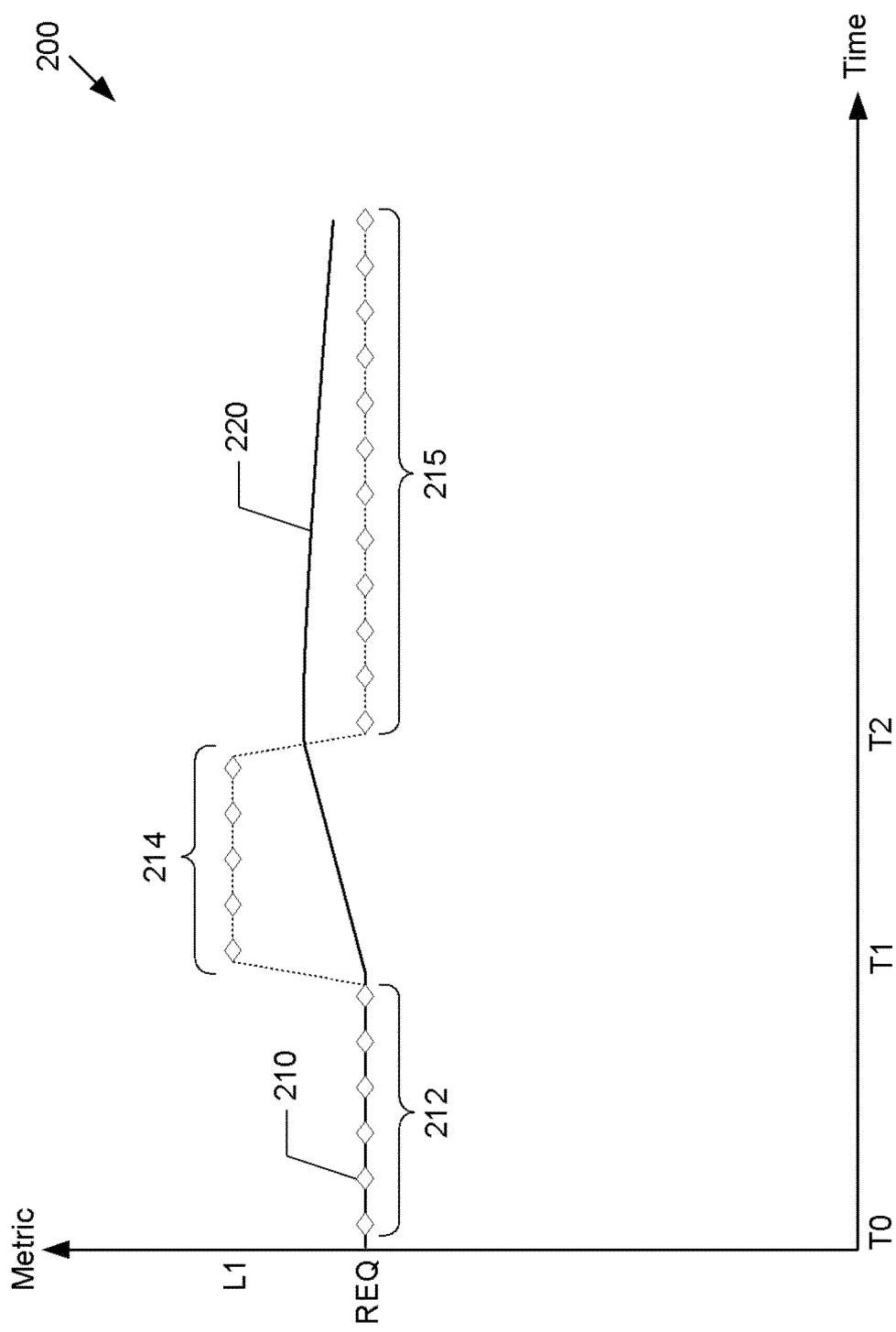
FIGS. 2A-2B are examples in accordance with one or more embodiments.

Referring now to FIG. 2A, shown is an example diagram 200 in accordance with one or more embodiments. In particular, the diagram 200 illustrates examples of reliability metrics of a particular device (e.g., system 100 or functional block 120 shown in FIG. 1A). As shown, the diagram 200 includes various data points 210 plotted between a "time" horizontal axis (corresponding to time of operation) and a "metric" vertical axis (corresponding to a reliability metric). Accordingly, each data point 210 may represent a current reliability metric value as determined at a particular point in time. In one or more embodiments, the values of the data points 210 may be obtained using the banking logic 110 shown in FIG. 1A.

The diagram 200 also includes an average line 220 (shown as a solid line). In some embodiments, the average line 220 may illustrate the average reliability metric at a given point in time (e.g., the cumulative average value of the data points 210 up to that point in time). As shown, the data points 210 are divided into a first group 212 (between time T0 and time T1), a second group 214 (between time T1 and time T2), and a third group 215 (after time T2). The first group 212 corresponds to a required level (labeled "REQ"), indicating that the current reliability metric values of the first group 212 matched the required level of the reliability metric. Stated differently, between time T0 and time T1, the device was determined to be operating at the required level of reliability (e.g., as specified in a design specification, a service agreement, etc.). Note that, because the first group 212 corresponds to the required level REQ, the average line 220 also matches the required level REQ between time T0 and time T1.

As shown, the second group 214 corresponds to a first level ("L1") that is above the required level REQ, indicating that the current reliability metric values of the second group 214 exceeded the required level of the reliability metric. Stated differently, between time T1 and time T2, the device was determined to be operating at a level of reliability exceeding the required level. This excess level of reliability may be referred to as the reliability surplus provided to the device. Note that, because the second group 214 is above the required level REQ, the average line 220 increases above the required level REQ between time T1 and time T2. In some embodiments, the amount by which the average line 220 exceeds the required level REQ may be used as an indication of the amount of reliability surplus provided to the device.

As shown, the third group 215 corresponds to the required level REQ, indicating that the current reliability metric values of the third group 215 again match the required level of the reliability metric. Stated differently, after time T2, the device was determined to again be operating at the required level of reliability.

Figure 2B:
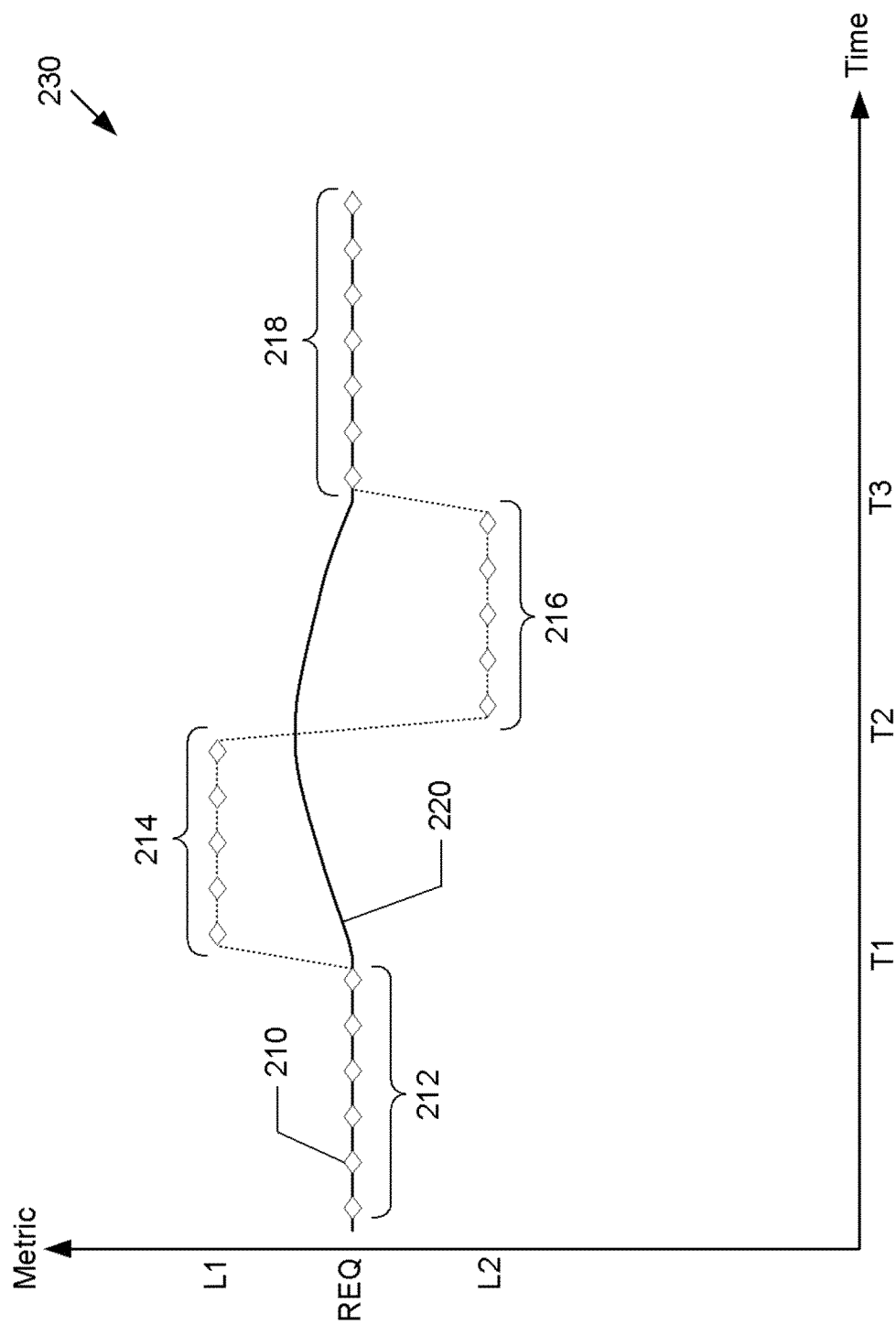

Referring now to FIG. 2B, shown is an example diagram 230 in accordance with one or more embodiments. More specifically, the diagram 230 may illustrate an example of the functionality of the banking logic 110. As shown, similar to the diagram 200 (shown in FIG. 2A), the diagram 230 includes data points 210 plotted between a "time" axis and a "metric" axis. Further, similar to the diagram 200, the diagram 230 includes the first group 212 (between time T0 and time T1) corresponding to the required level REQ, and the second group 214 (between time T1 and time T2) corresponding to the first level L1.

However, in contrast to the diagram 200, the diagram 230 also includes a fourth group 216 (including the data points 210 between time T2 and time T3) and a fifth group 218 (including the data points 210 after time T3). As shown, the fourth group 216 corresponds to a second level ("L2") that is below the required level REQ, indicating that the current reliability metric values of the fourth group 216 failed to meet the required level of the reliability metric. Stated differently, between time T2 and time T3, the device was determined to be operating at a level of reliability below the required level REQ. This shortfall in the level of reliability may be referred to as a reliability deficit.

Note that, in the diagram 230, the distance by which the fourth group 216 is below the required level REQ is similar to the distance by which the second group 214 is above the required level REQ above the average line 220. As such, the fourth group 216 has the effect of offsetting the increase of the average line 220 caused by the second group 214, and thus the average line 220 returns to the required level REQ by time T3.

Referring again to FIG. 1A, in some embodiments, the banking logic 110 may include functionality to modify and/or control the reliability components 125 to implement one or more reduced reliability modes, meaning operating states or configurations resulting in relatively lower reliability metric values. In some embodiments, such reduced reliability modes may be associated with a reduction in the electrical power consumed by the functional block 120. For example, reduced reliability modes may involve lower voltages, reduced error detection and correction levels, modified frequencies/clock rates, etc.

In one or more embodiments, the banking logic 110 may include functionality to selectively operate in one or more reduced reliability modes when the average reliability metric exceeds a required level. For example, referring to FIGS. 1A and 2B, the banking logic 110 may determine that, at time T2, the average line 220 is above the required level REQ. In response, the banking logic 110 may cause the reliability components 125 to operate in a reduced reliability mode, thus lowering the current reliability metric values for a period of time (e.g., as illustrated by the fourth group 216 shown in FIG. 2B). In some embodiments, the banking logic 110 may maintain the reduced reliability mode until the average reliability metric drops back to the required level. This functionality of the banking logic 110 may be referred to as "banking" the average reliability metric, meaning that temporary increases in the average reliability metric are offset by temporary decreases in the average reliability metric.

Optionally, in some embodiments, the banking logic 110 may initiate the reduced reliability mode when the average reliability metric exceeds the required level REQ by a defined threshold. Such a threshold may be, e.g., a percentage, a quantity, etc. Further, in some embodiments, the banking logic 110 may initiate the reduced reliability mode when the average reliability metric exceeds the required level REQ for at least a minimum time period.

Note that, as described above, a reduced reliability mode may reduce the amount of electrical power that is consumed by the functional block 120. Further, by banking the average reliability metric, the banking logic 110 can implement a reduced reliability mode while maintaining the average reliability metric at or above the required level (i.e., without violating the required level of reliability). Thus, in this manner, the banking logic 110 may reduce the total power consumed by the functional block 120 and/or the system 100.

In some embodiments, the banking logic 110 may include functionality to control the reliability components 125 to operate in one or more enhanced reliability modes, meaning operating states or configurations resulting in relatively higher current reliability metric values. In some embodiments, such enhanced reliability modes may be associated with a relative increase in the electrical power consumed by the functional block 120. For example, enhanced reliability modes may involve higher voltages, elevated error detection and correction levels, higher frequencies/clock rates, etc.

In one or more embodiments, the banking logic 110 may include functionality to selectively operate in an enhanced reliability mode when the average reliability metric is below a required level. Further, in some embodiments, the banking logic 110 may maintain the enhanced reliability mode until the average reliability metric rises back to the required level.

In some embodiments, banking the average reliability metric may be used for purposes other than (or in addition to) reduction in power consumption. For example, the banking logic 110 may control the reliability components 125 to enable capacity optimization, lifecycle management, thermal loading control, bandwidth management, noise reduction, etc.

Figure 1B:
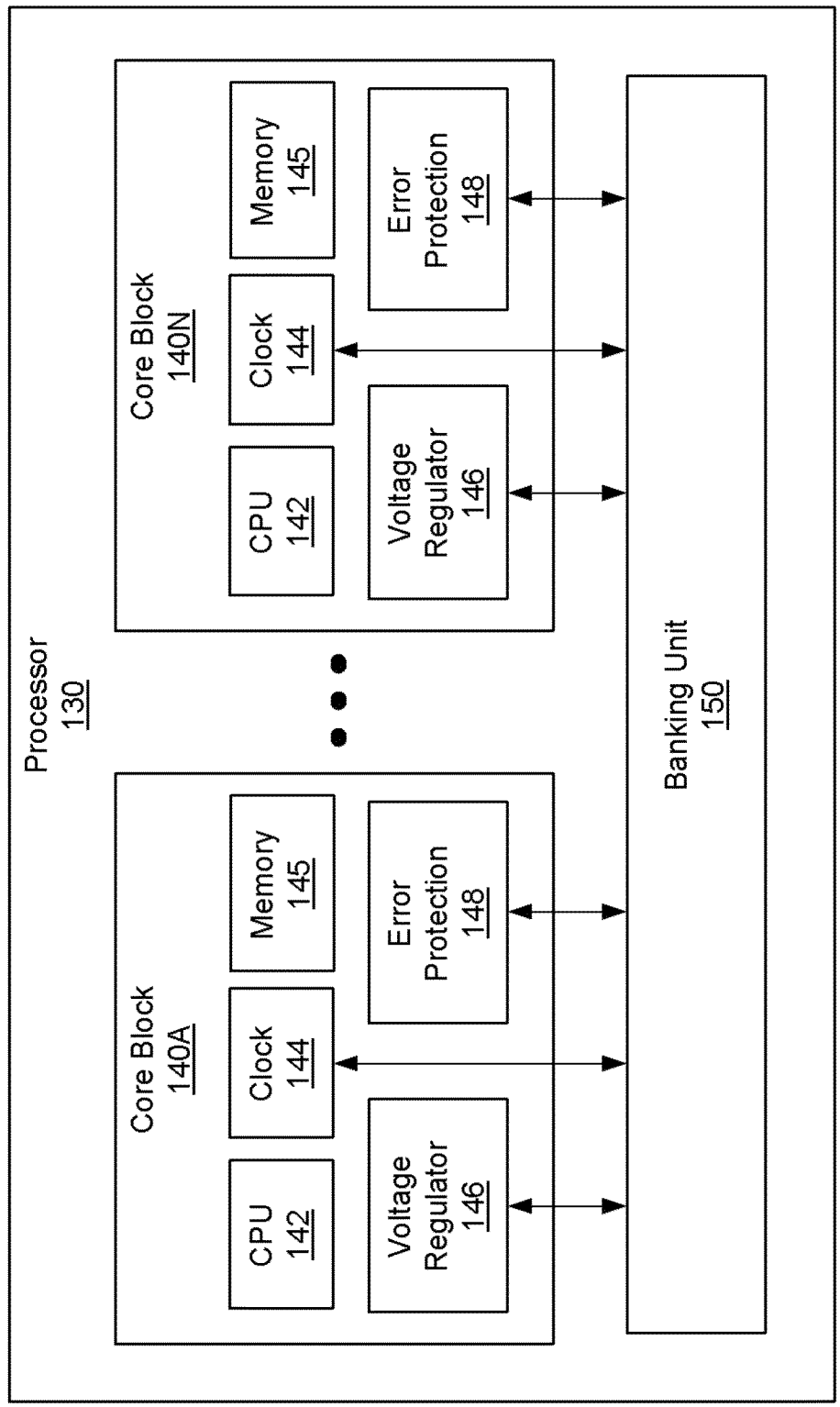

Referring now to FIG. 1B, shown is a block diagram of a processor 130 in accordance with one or more embodiments. More specifically, the processor 130 may generally correspond to an example embodiment of the system 100 shown in FIG. 1A.

As shown, the processor 130 may include any number of core blocks 140A-140N and a banking unit 150. Note that each core block 140 may generally correspond to an example embodiment of a functional block 120 shown in FIG. 1A. Further, the banking unit 150 may generally correspond to an example embodiment of the banking logic 110 shown in FIG. 1A.

In one or more embodiments, each core block 140 may represent a separate processing module within the processor 130. For example, as shown in FIG. 2B, each core block 140 may include a central processing unit (CPU) 142, a clock circuit 144, memory 145, a voltage regulator 146, and/or error protection circuits 148. Further, each core block 140 may include any number of additional components (not shown).

In one or more embodiments, the clock circuit 144 may provide a clock signal to control the timing of the components of the core block 140. For example, the clock circuit 144 may provide a clock signal to the CPU 142, memory 145, etc.

In one or more embodiments, the voltage regulator 146 may control the voltage used by one or more components of the core block 140. For example, the voltage regulator 146 may control the voltage level provided to the CPU 142, memory 145, etc.

In one or more embodiments, the error protection circuits 148 may include functionality to prevent, detect, and/or correct data errors due to system faults (e.g., transmission noise, cosmic radiation, power surge, media degradation, etc.). For example, in some embodiments, the error protection circuits 148 may provide data redundancy functionality for the CPU 142, error-correcting code (ECC) functionality for the memory 145, etc.

In some embodiments, the respective functionalities of the clock circuit 144, the voltage regulator 146, and/or the error protection circuits 148 may affect the reliability associated with each core block 140 and/or the processor 130. As such, the clock circuit 144, the voltage regulator 146, and/or the error protection circuits 148 may represent example embodiments of the reliability components 125 shown in FIG. 1A.

In one or more embodiments, the banking logic 110 may include functionality to obtain current reliability metric values for the core block 140. Further, in some embodiments, the banking unit 150 may include functionality to determine an average reliability metric based on the current reliability metric values.

In one or more embodiments, the banking unit 150 may control the clock circuit 144, the voltage regulator 146, and/or the error protection circuits 148 to selectively operate in one or more reduced reliability modes based on the average reliability metric. In this manner, the banking unit 150 may reduce the electrical power consumed by the core block 140. For example, in some embodiments, the banking unit 150 may control the clock circuit 144 to adjust the frequency of the clock signal (e.g., dynamic frequency scaling), and may thus reduce the level of power consumed by the core block 140. In another example, the banking unit 150 may control the voltage regulator 146 to adjust voltage levels (e.g., dynamic voltage scaling), and may thereby reduce the level of power consumption. In yet another example, the banking unit 150 may control the error protection circuits 148 to adjust the level of error protection provided to the core block 140 (e.g., deactivate data redundancy protection, downgrade ECC functions, etc.), and may thus reduce the level of power consumption.

Figure 3:
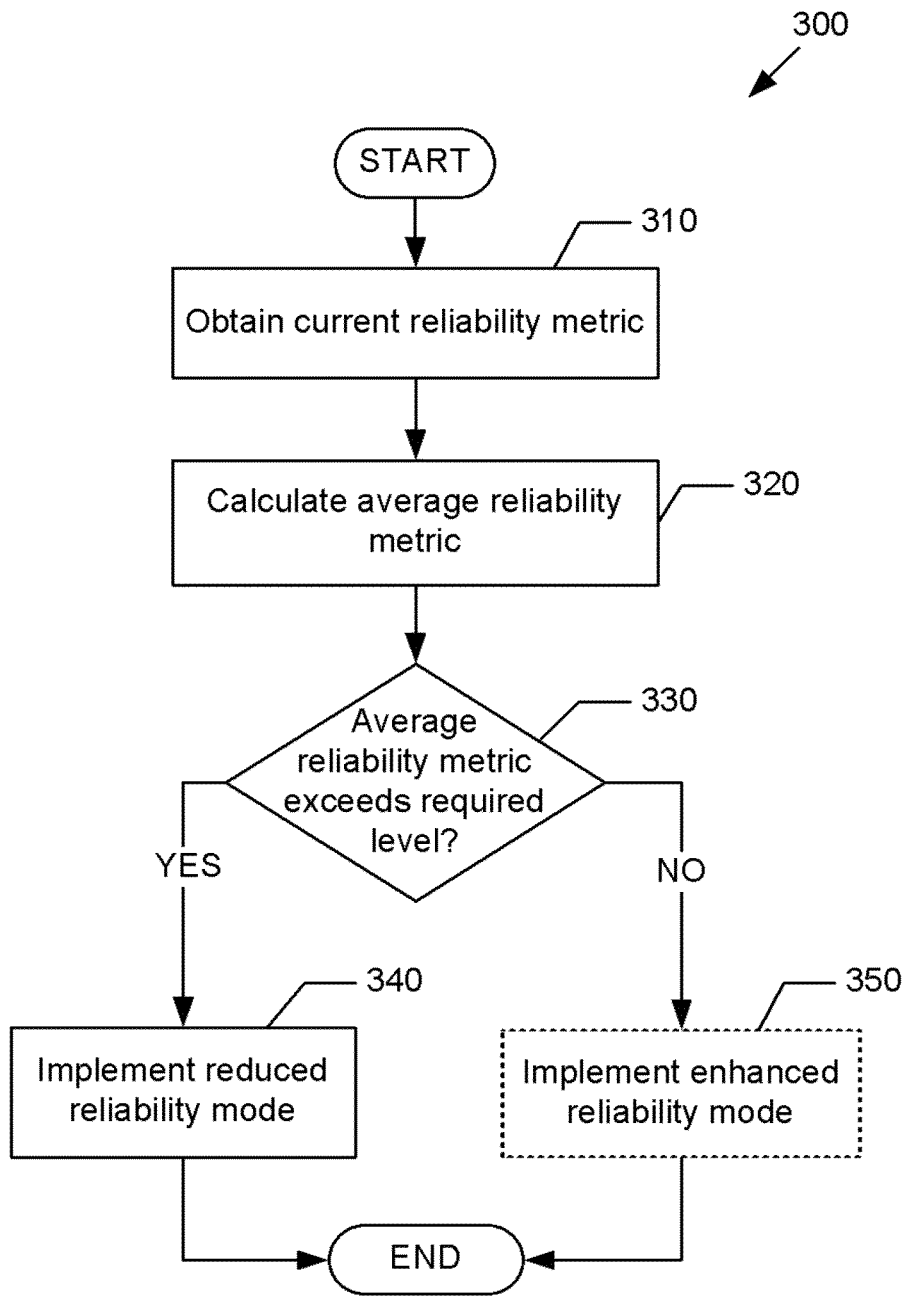
FIG. 3 is a sequence in accordance with one or more embodiments.

Referring now to FIG. 3, shown is a sequence 300 for managing reliability metrics, in accordance with one or more embodiments. In one or more embodiments, the sequence 300 may be part of the banking logic 110 shown in FIG. 1A. The sequence 300 may be implemented in hardware, software, and/or firmware. In firmware and software embodiments it may be implemented by computer executed instructions stored in a non-transitory computer readable medium, such as an optical, semiconductor, or magnetic storage device.

At step 310, current reliability metric values may be obtained. For example, referring to FIG. 1A, the banking logic 110 may determine and store current reliability metric values corresponding to various points in time. In some embodiments, the current reliability metric value may be based on system factors (e.g., a frequency, voltage levels, AVFs, etc.), environmental factors (e.g., temperature, humidity, altitude, bandwidth usage, etc.), and/or any other factors.

At step 320, an average reliability metric may be calculated. For example, referring to FIG. 1A, the banking logic 110 may determine the average reliability metric by averaging the current reliability metric values corresponding to a specified period of time. One example of the average reliability metric is illustrated by the average line 220 shown in FIGS. 2A-2B.

At step 330, a determination about whether the average reliability metric exceeds a required level may be made. For example, referring to FIG. 1A, the banking logic 110 may determine whether the average reliability metric exceeds a required level. In some embodiments, this determination may be based on whether the average reliability metric exceeds the required level by a defined threshold, for at least a minimum time period, etc.

If it is determined at step 330 that the average reliability metric exceeds the required level, then at step 340, one or more reduced reliability modes may be implemented. For example, referring to FIG. 1B, the banking unit 150 may control the voltage regulator 146 to reduce a voltage level, thereby reducing the electrical power consumed by the core block 140. In some embodiments, the banking unit 150 may control the voltage regulator 146 to maintain the reduced voltage level until the average reliability metric returns to the required level. After step 340, the sequence 300 ends.

However, if it is determined at step 330 that the average reliability metric does not exceed the required level, then the sequence 300 may continue at step 350. Optionally, at step 350, one or more enhanced reliability modes may be implemented. For example, referring to FIG. 1B, the banking unit 150 may control the error protection circuits 148 to increase the level of error protection provided to the core block 140. In some embodiments, the banking unit 150 may control the error protection circuits 148 to maintain the increased level of error protection until the average reliability metric returns to the required level. After step 350, the sequence 300 ends. Alternatively, in some embodiments, step 350 may be omitted. That is, if it is determined at step 330 that the average reliability metric does not exceed the required level, then the sequence 300 may end without performing any additional actions.

Note that the examples shown in FIGS. 1A-1B, 2A-2B, and 3 are provided for the sake of illustration, and are not intended to limit any embodiments. For instance, while embodiments may be shown in simplified form for the sake of clarity, embodiments may include any number and/or arrangement of processors, cores, and/or additional components (e.g., buses, storage media, connectors, power components, buffers, interfaces, etc.). In particular, it is contemplated that some embodiments may include any number of components other than those shown, and that different arrangement of the components shown may occur in certain implementations. Further, it is contemplated that specifics in the examples shown in FIGS. 1A-1B, 2A-2B, and 3 may be used anywhere in one or more embodiments.

Figure 4:
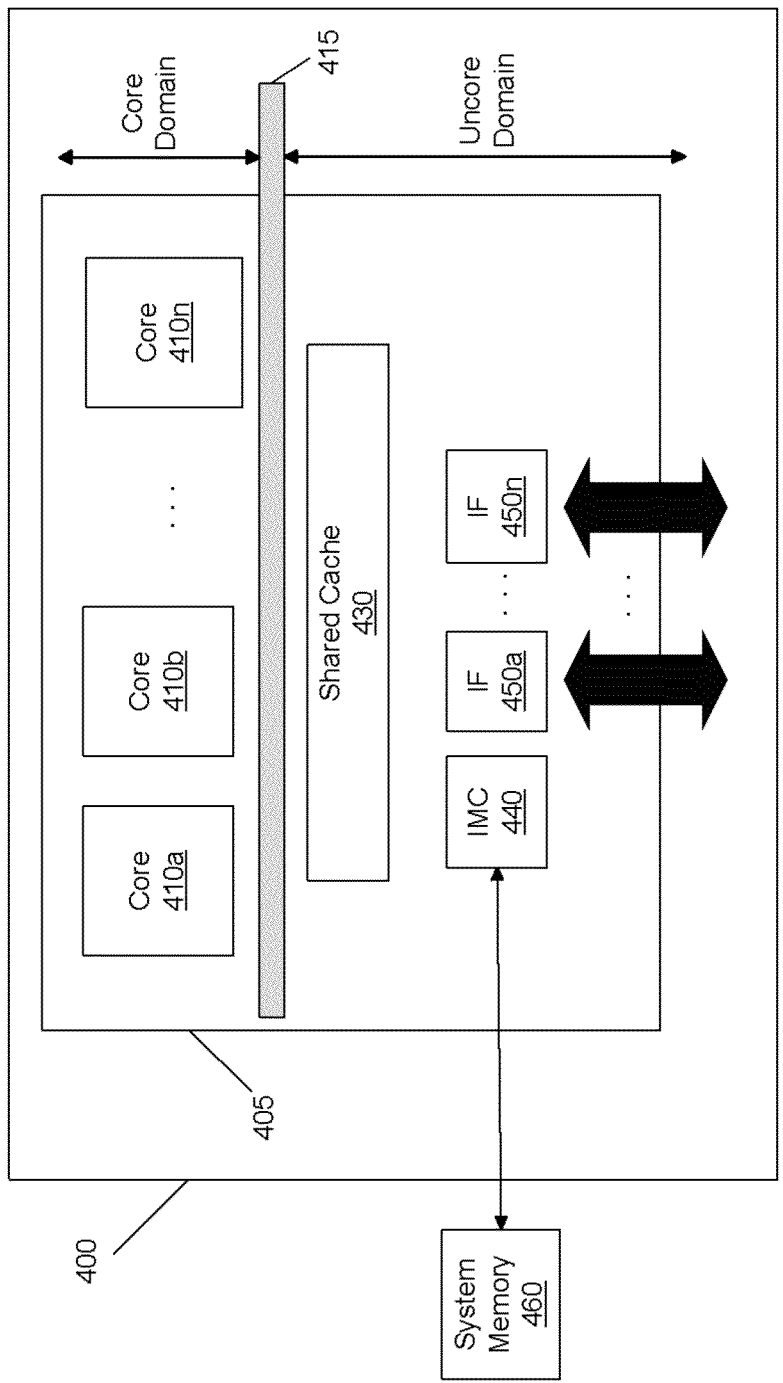
FIG. 4 is a block diagram of a processor in accordance with an embodiment of the present invention.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain 420 that includes various components. As seen, the uncore domain 420 may include a shared cache 430 which may be a last level cache. In addition, the uncore may include an integrated memory controller 440 and various interfaces 450.

Although not shown for ease of illustration in FIG. 4, in some embodiments, each of the cores 410a-410n may include the banking logic 110 shown in FIG. 1A. Alternatively, in some embodiments, some or all of the banking logic 110 may be included in the uncore domain 420, and may thus be shared across the cores 410a-410n.

With further reference to FIG. 4, the processor 400 may communicate with a system memory 460, e.g., via a memory bus. In addition, by interfaces 450, connection can be made to various off-package components such as peripheral devices, mass storage and so forth. While shown with this particular implementation in the embodiment of FIG. 4, the scope of the present invention is not limited in this regard.

Figure 5:
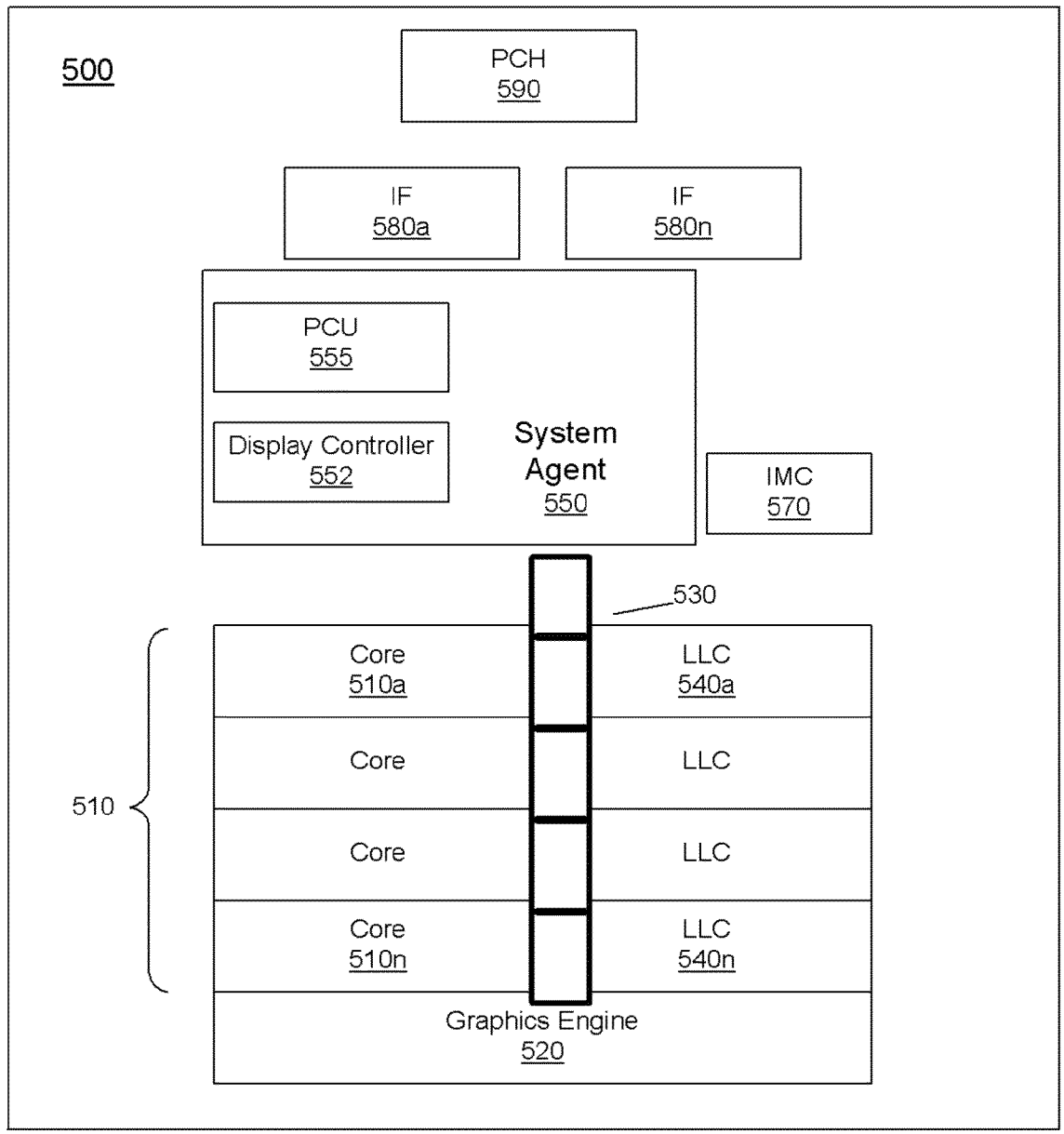
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Although not shown for ease of illustration in FIG. 5, in some embodiments, each of the cores 510a-510n can include the banking logic 110 described above with reference to FIG. 1A. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) 540a-540n. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In the embodiment of FIG. 5, system agent domain 550 may include display controller 552 which may provide control of and an interface to an associated display. As further seen, system agent domain 550 may also include a power control unit 555 to allocate power to the CPU and non-CPU domains.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor, and can be implemented on a separate die, in some embodiments. Although shown at this high level in the embodiment of FIG. 5, understand the scope of the present invention is not limited in this regard.

Figure 6:
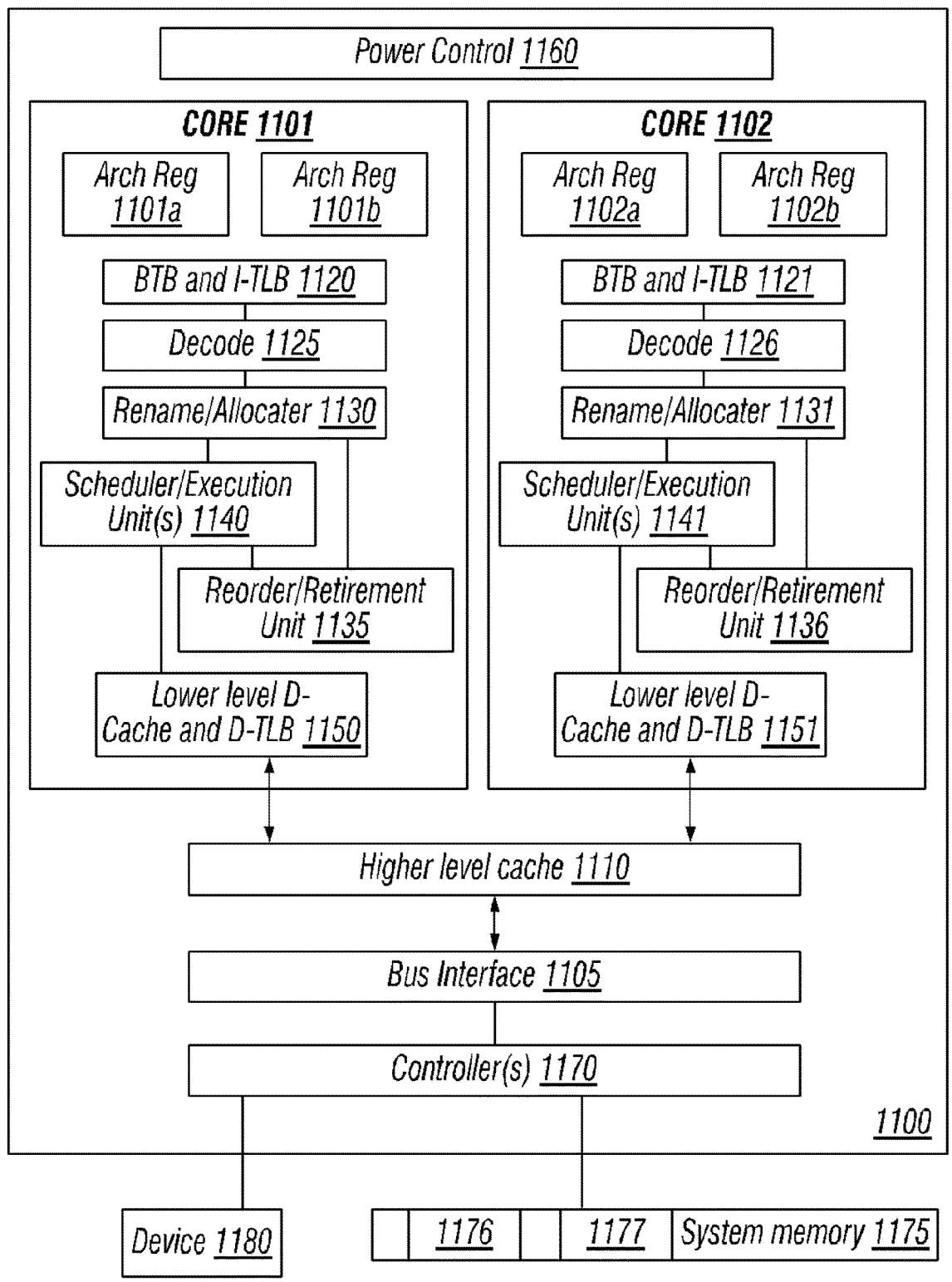
FIG. 6 is a block diagram of an embodiment of a processor including multiple cores.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric. Although not shown for ease of illustration in FIG. 6, in some embodiments, each of the cores 1101 and 1102 can include the banking logic 110 described above with reference to FIG. 1A.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above.

As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. As a result of the recognition by decoders 1125, the architecture or core 1101 takes specific, predefined actions to perform tasks associated with the appropriate instruction (e.g., the actions shown in FIG. 3). It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 7:
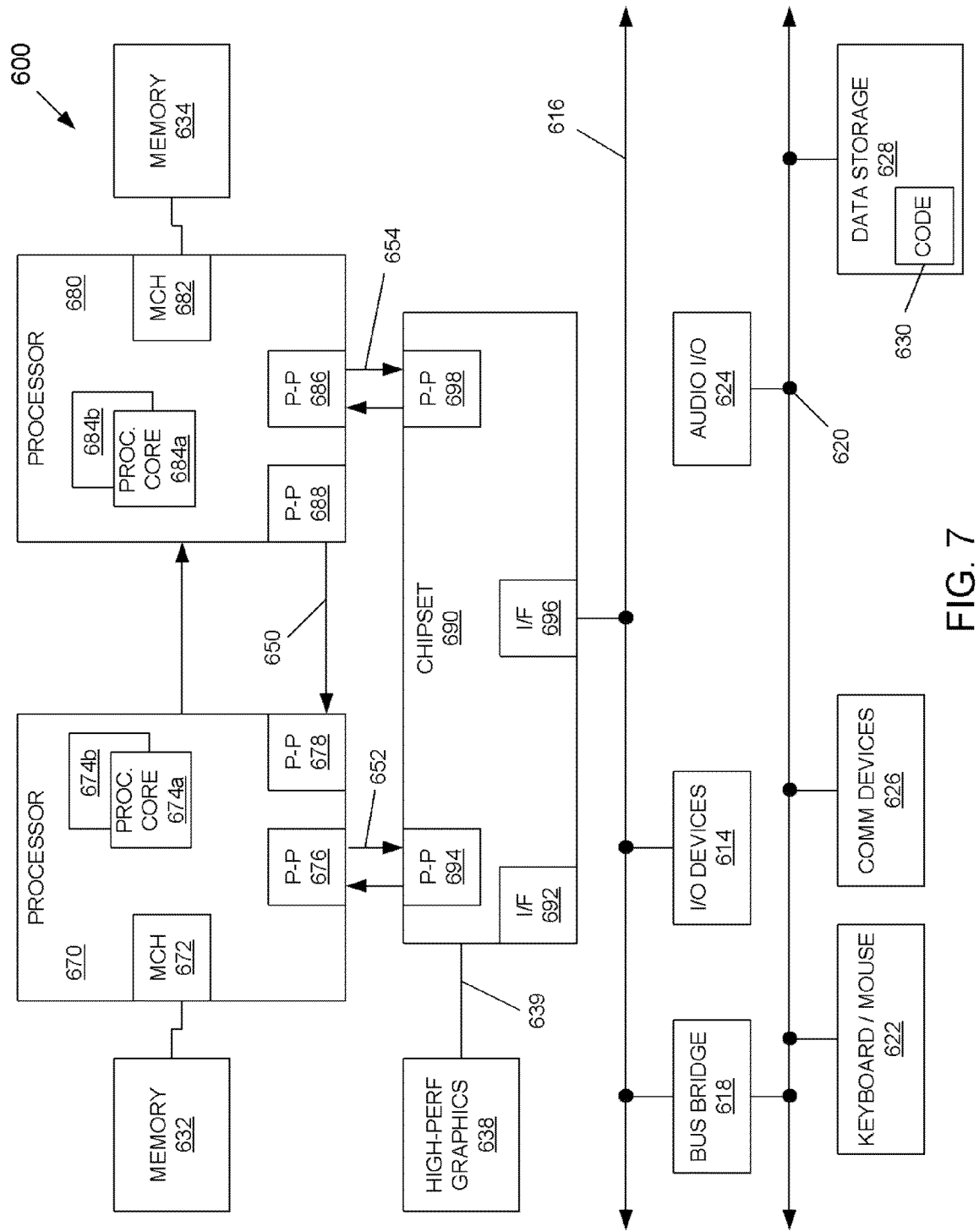
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Each of these processors can include the banking logic 110 described above with reference to FIG. 1A.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, BiCMOS, CMOS, or NMOS.

It is contemplated that the processors described herein are not limited to any system or device. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk readonly memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. One example embodiment may be a processor including at least one functional block and banking logic. The banking logic may be to: determine an average reliability metric associated with the at least one functional block, and if the average reliability metric exceeds a required level, implement a reduced reliability mode in the at least one functional block, where the reduced reliability mode is associated with a reduction in the average reliability metric. The at least one functional block may include at least one execution unit. The banking logic may be further to: determine a plurality of current reliability metric values, each corresponding to a unique point in time; and average the plurality of current reliability metric values to obtain the average reliability metric. The banking logic may be to determine the plurality of current reliability metric values based on at least one system factor, including at least one of a voltage level, a clock frequency, and an architectural vulnerability factor (AVF). The banking logic may be to determine the plurality of current reliability metric values based on at least one environmental factor, including at least one of a temperature, a humidity level, an altitude, and a network traffic level. The banking logic may be to store the plurality of current reliability metric values in a storage of the processor. The average reliability metric may be an average Failures In Time (FIT) metric. The reduced reliability mode may include a reduced voltage level for the at least one functional block. The banking logic may be further to, if the average reliability metric fails to meet or exceed the required level, implement an enhanced reliability mode in the at least one functional block.

Another example embodiment may be a system including a plurality of functional blocks, each including at least one hardware component, and banking logic. The banking logic may be to: determine an average reliability metric for each of the plurality of functional blocks; determine, based on the average reliability metric for a particular block of the plurality of functional blocks, a reliability surplus amount for the particular block; and implement a reduced reliability mode to obtain a reliability deficit amount for the particular block, wherein the reliability deficit amount is to offset the reliability surplus amount. Each of the plurality of functional blocks may be a computer host connected by a network. The banking logic may be to determine the average reliability metric based on a plurality of current reliability metric values. Each of the plurality of current reliability metric values may correspond to a unique point in time. The reduced reliability mode may include a reduced power level associated with the particular functional block. The reduced reliability mode may include a reduced error protection level associated with the particular functional block.

Yet another example embodiment may be a method, including: determining, by a banking unit of a hardware device, an average reliability metric for at least one component of the hardware device; determining whether the average reliability metric exceeds a required level; and if the average reliability metric exceeds the required level, implementing a reduced reliability mode in the at least one component, where the reduced reliability mode is associated with a reduction in the average reliability metric. Determining the average reliability metric may include: determining a plurality of current reliability metric values; and averaging the plurality of current reliability metric values. Each of the plurality of current reliability metric values may correspond to a unique point in time. Each of the plurality of current reliability metrics may be based on one or more configuration factors of the hardware device. The method may include reducing the average reliability metric to obtain a reliability deficit period, where the reliability deficit period is to offset a reliability surplus period. Implementing the reduced reliability mode may include lowering a voltage level provided to the hardware device. The reduced reliability mode may be associated with a reduction in the amount of power consumed by the at least one component. The required level may be based on a design specification for reliability.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:
1. A processor comprising:
   at least one functional block; and
   banking logic to:

determine a plurality of current reliability metric values associated with the at least one functional block, each of the plurality of current reliability metric values corresponding to a unique point in time;

store the plurality of current reliability metric values in a storage of the processor;

average the stored plurality of current reliability metric values to obtain an average reliability metric associated with the at least one functional block; and if the average reliability metric exceeds a required level, implement a reduced reliability mode in the at least one functional block, wherein the reduced reliability mode is associated with a reduction in the average reliability metric.

2. The processor of claim 1, wherein the at least one functional block comprises at least one execution unit.

3. The processor of claim 1, wherein the banking logic is to determine the plurality of current reliability metric values based on at least one system factor, including at least one of a voltage level, a clock frequency, and an architectural vulnerability factor (AVF).

4. The processor of claim 1, wherein the banking logic is to determine the plurality of current reliability metric values based on at least one environmental factor, including at least one of a humidity level, an altitude, and a network traffic level.

5. The processor of claim 1, wherein the average reliability metric is an average Failures In Time (FIT) metric.

6. The processor of claim 1, wherein the reduced reliability mode comprises a reduced voltage level for the at least one functional block.

7. The processor of claim 1, wherein the banking logic is further to:

if the average reliability metric fails to meet or exceed the required level, implement an enhanced reliability mode in the at least one functional block.

8. A system comprising:

a plurality of functional blocks, each including at least one hardware component; and banking logic to:
 determine a plurality of current reliability metric values for each of the plurality of functional blocks, each of the plurality of current reliability metric values corresponding to a unique point in time;
 store the plurality of current reliability metric values for each of the plurality of functional blocks in a storage medium;
 average the stored plurality of current reliability metric values for each of the plurality of functional blocks to obtain an average reliability metric for each of the plurality of functional blocks;
 determine, based on the average reliability metric for a particular block of the plurality of functional blocks, a reliability surplus amount for the particular block; and
 implement a reduced reliability mode to obtain a reliability deficit amount for the particular block, wherein the reliability deficit amount is to offset the reliability surplus amount.

9. The system of claim 8, wherein each of the plurality of functional blocks is a computer host connected by a network.

10. The system of claim 8, wherein the reduced reliability mode comprises a reduced power level associated with the particular functional block.

11. The system of claim 8, wherein the reduced reliability mode comprises a reduced error protection level associated with the particular functional block.

12. A method, comprising:

determining, by a banking unit of a hardware device, a plurality of current reliability metric values associated with at least one component of the hardware device, each of the plurality of current reliability metric values corresponding to a unique point in time;

storing, in a storage of the hardware device, the plurality of current reliability metric values;

averaging the stored plurality of current reliability metric values to obtain an average reliability metric for the at least one component of the hardware device;

determining whether the average reliability metric exceeds a required level; and if the average reliability metric exceeds the required level, implementing a reduced reliability mode in the at least one component, wherein the reduced reliability mode is associated with a reduction in the average reliability metric.

13. The method of claim 12, wherein each of the plurality of current reliability metrics is based on one or more configuration factors of the hardware device.

14. The method of claim 12, further comprising:

reducing the average reliability metric to obtain a reliability deficit period, wherein the reliability deficit period is to offset a reliability surplus period.

15. The method of claim 12, wherein implementing the reduced reliability mode comprises lowering a voltage level provided to the hardware device.

16. The method of claim 12, wherein the reduced reliability mode is associated with a reduction in the amount of power consumed by the at least one component.

17. The method of claim 12, wherein the required level is based on a design specification for reliability.

* * * * *